(12) United States Patent
Claus et al.

(10) Patent No.: US 6,496,782 B1
(45) Date of Patent: Dec. 17, 2002

(54) ELECTRIC MACHINE MONITORING METHOD AND SYSTEM

(75) Inventors: Bernhard Erich Hermann Claus, Niskayuna, NY (US); Gerald Burt Kliman, Niskayuna, NY (US); Nicolas Wadih Chbat, Albany, NY (US)

(73) Assignee: General Electric Company, Niskayuna, NY (US)

( * ) Notice: Subject to any disclaimer, the term of this patent is extended or adjusted under 35 U.S.C. 154(b) by 57 days.

(21) Appl. No.: 09/699,089

(22) Filed: Oct. 30, 2000

(51) Int. Cl.$^7$ .............................................. G06E 19/00
(52) U.S. Cl. ......................................... 702/40; 702/34
(58) Field of Search .................... 702/56, 34; 618/490, 618/806; 187/29 R; 73/146; 359/191; 364/551.02

(56) References Cited

U.S. PATENT DOCUMENTS

| | | | |
|---|---|---|---|
| 4,467,895 A | * 8/1984 | Smith et al. | ............... 187/29 R |
| 4,965,513 A | 10/1990 | Haynes et al. | |
| 5,510,927 A | * 4/1996 | Noe | ............................ 359/191 |
| 5,566,092 A | * 10/1996 | Wang et al. | ............ 365/551.02 |
| 5,570,256 A | 10/1996 | Schoen et al. | |
| 5,629,870 A | 5/1997 | Farag et al. | |
| 5,644,458 A | 7/1997 | Schoen et al. | |
| 5,680,025 A | * 10/1997 | Bower, III et al. | .......... 318/806 |
| 5,817,936 A | * 10/1998 | Schricker | ...................... 73/146 |
| 5,943,634 A | * 8/1999 | Piety et al. | .................... 702/56 |
| 6,124,692 A | * 9/2000 | Canada et al. | ............... 318/490 |
| 6,199,018 B1 | * 3/2001 | Quist et al. | .................... 702/34 |

OTHER PUBLICATIONS

L. Devroye, et al, "A Probabiliatic Theory of Pattern Recognition", 1997, pp. 46–47.
B. Flury. et al, "Multiple Linear Regression", Multivariate Statistics a Practical Approach, CH.5, pp. 55–75, 1988.
PJ Rousseeuw, "Robust Estimation and Identifying Outliers", Handbook Of Statistical Methods for Engineers and Scientists, CH. 17, pp. 17.1–17.26.
R. Duda, et al, "Pattern Classification and Scene Analysis", pp. 114–119, 1973.
US Patent Application Entitled "Gear Transmission Condition Monitoring Method and Apparatus", Ser. No. 09/618, 440, Filed Jul. 18, 2000, Attorney Docket RD–26,982 By Suresh Reddy, Et Al.

* cited by examiner

*Primary Examiner*—John S. Hilten
*Assistant Examiner*—Xiuquin Sun
(74) *Attorney, Agent, or Firm*—Ann M. Agosti; Jill M. Breedlove (57) ABSTRACT

A machine monitoring method includes obtaining signals indicative of machine conditions, machine rotational speed, direction, and load conditions over a segment of time, transforming the obtained signal indicative of machine conditions into a frequency spectrum, identifying low level features of the frequency spectrum, and processing the low level features to obtain an indicator value representative of the machine conditions.

38 Claims, 5 Drawing Sheets

ELECTRIC MACHINE MONITORING METHOD AND SYSTEM

BACKGROUND

The invention relates generally to electric machine monitoring and more particularly to gear and bearing monitoring.

Locomotive traction systems include traction motors, gears, axles, wheel-sets, and bearings. The gears are often lubricated with oil, and the pinion gear is sometimes fitted onto the traction motor shaft using an interference or shrink fit. In some situations, the oil in a gear case also lubricates motor bearings through a passage from the gear case to the bearings. There are several failures that can result in gear problems, including, for example, cracks in gear teeth due to excessive loading and loss of lubrication resulting in gear teeth wear. Loss of lubrication and/or gear problems can lead to gear damage, slipping of pinion gear on the motor shaft, and/or damage to bearings from vibrations that result in motor failures, and ultimately road failures. Prevention of serious gear, bearing, motor and road failures through incipient failure detection would therefore be desirable.

Haynes et al., U.S. Pat. No. 4,965,513, describes a motor current signature analysis method for diagnosing motor operated devices such as motor-operated valves (MOVs). Frequency domain signal analysis techniques are applied to a conditioned motor current signal to identify various operating parameters of the motor-driven device from the motor current signature. Motor current noise is assumed to include the sum of all the mechanical load changes which refer back to the electric motor drive, and the changes are described as being separated on a frequency and amplitude basis such that the source of various changes in load, such as periodic gear mesh loading, friction events at frequencies corresponding to their origin, and other motor load varying characteristics of the device, can be identified. Motor current noise signatures are taken at different periods during the operating life of the device and compared to determine aging and wear or abnormal operating characteristics. The embodiment of Haynes et al. appears to assume a fixed frequency system with a signal-to-noise ratio that is high enough (that is, any interfering signals are low enough) for accurate signal detection. MOVs operate in highly-controlled environments with well-prescribed duty cycles and typically run steadily without experiencing operating conditions that generate confounding signals. More sophisticated processing techniques are desirable for general industrial environments and are particularly desirable for locomotive environments with varying speed and load conditions and non-uniform track-related signals.

BRIEF SUMMARY

Problems in the combination of the traction motor and wheel set of a locomotive which are related to gears (insufficient lubrication due to oil-loss, gear wear, or cracks, for example) and bearings (damaged bearings or loss of lubrication, for example) are reflected in the torque of the motor. Under substantially constant operating conditions (that is, the rotational direction does not change and neither the rotational speed nor the load deviates by more than about 5%), such problems lead to substantially periodic additive components of the torque which are not present for a healthy motor. The period of the additive components is determined by the rotational speed of the motor, the number of teeth on the gears, and/or characteristics of the bearings. According to one embodiment of the present invention, using spectral analysis, characteristic features in relevant frequency bands of machine rotational frequency, current, voltage, vibration or torque signals can be extracted and summarized in an indicator value for the level of wear.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF THE INVENTIONS

Figure 1:
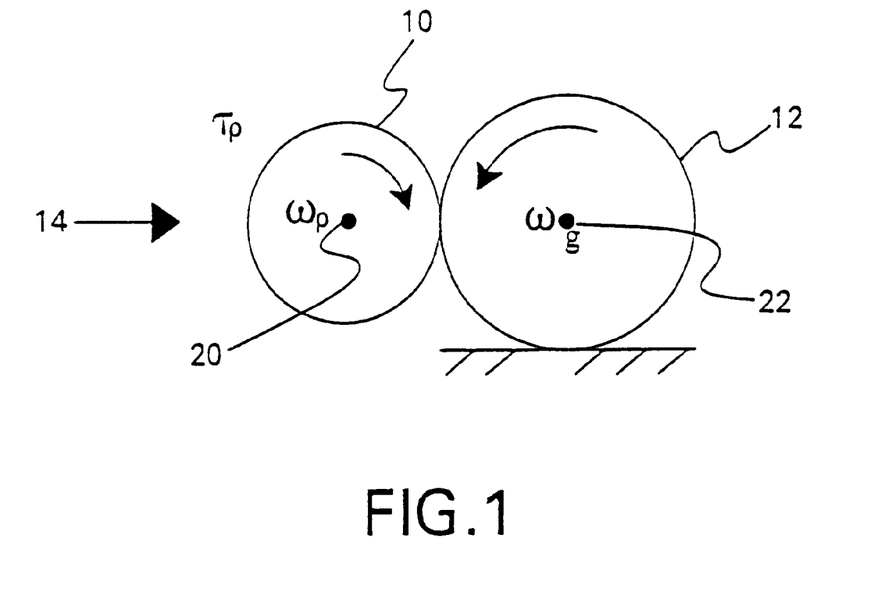
FIGS. 1 and 2 are schematic diagrams of a gear transmission.
Figure 2:
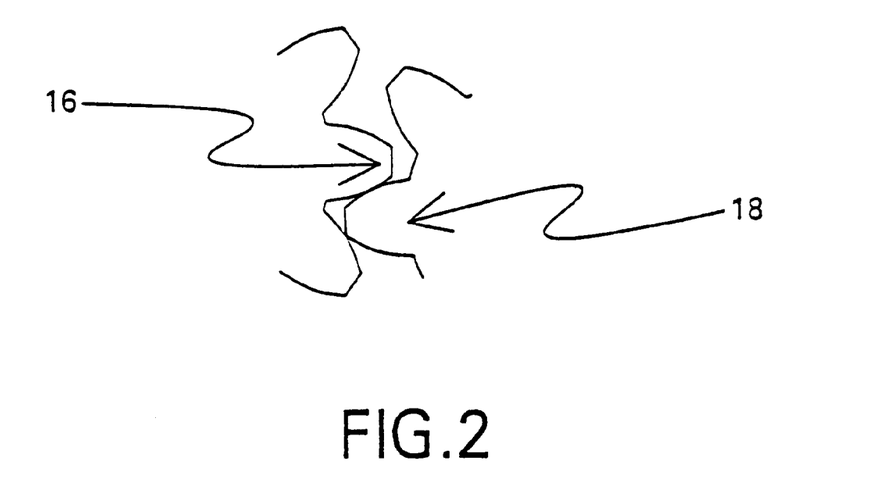

FIGS. 1 and 2 are schematic diagrams of a gear transmission 14 with FIG. 1 illustrating a large scale view of two gears (pinion gear 10 and bull gear 12) and FIG. 2 illustrating an enlarged view of several teeth 16 and 18 of the gears. The present invention is not limited to spur or helical gearing. For example, the present invention is applicable to bearings, bevel, worm and other gearings, and other rotational phenomena.

Figure 3:
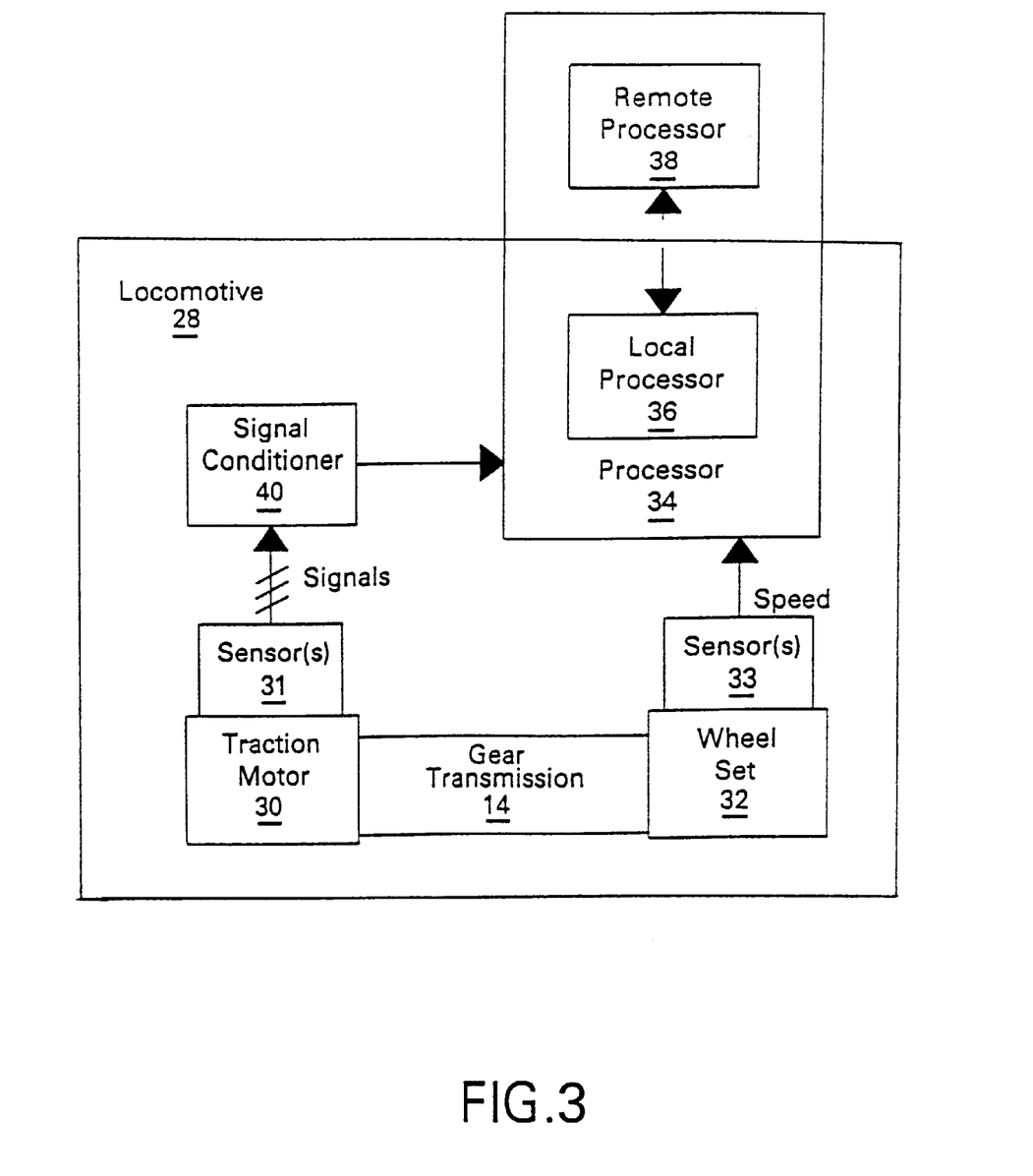
FIG. 3 is a block diagram of an example embodiment in which the present invention may be incorporated.

FIG. 3 is a block diagram of an example embodiment in which the present invention may be incorporated. A locomotive 28 includes machines shown as traction motors 30 coupled by respective gear transmissions 14 to respective wheel-sets 32. Although one set of motor, gear transmission, and wheel-set is shown for purposes of example, in practice, locomotives include multiple sets. Referring to FIGS. 1 and 3, torque $\tau_p$ is applied to the pinion gear 10 through shaft 20 of the machine (traction motor 30 in FIG. 3). Pinion gear 10 meshes with bull gear 12 (FIG. 1) which is mounted on axle 22 (FIG. 1) of wheel-set 32 (FIG. 3). The axle and wheel-set rotate along with the bull gear. The tractive effort generated at the wheel-rail interface pulls the wheel-set, locomotive, and train forward. Angular velocities of the pinion gear and bull gear are respectively labeled as $\omega_p$ and $\omega_g$ in FIG. 1. A processor 34 (shown in FIG. 3) including one or more processors (shown for purposes of example as local processor 36 and remote processor 38) can receive the signals from traction motor 30 (via signal conditioner 40, for example) and/or from wheel set 32 (via sensor(s) 33, for example). In one embodiment, processor 34 comprises one or more digital and/or analog computers, for example.

According to one embodiment of the present invention, a machine 30 (shown as traction motor 30 in FIG. 3 for purposes of example) monitoring method includes obtaining signals indicative of machine conditions, machine rotational speed, machine rotational direction, and load conditions over a segment of time, transforming the obtained signal indicative of machine conditions into a frequency spectrum, identifying low level features of the frequency spectrum, and processing the low level features to obtain an indicator value representative of the machine conditions. Although a traction motor is described in several instances herein for purposes of example, the machine is not limited to traction motors and may comprise any type of machine including an electric motor, an electric generator, and/or an electric drive system for a motor or generator, for example.

The segment of time in which signals indicative of machine conditions are obtained occurs under substantially constant operating conditions. That is, the rotational direction does not change and neither the rotational frequency nor the load deviates by more than about 5%. During typical machine operation, fine variations in machine rotational frequency occur with the local averages of the machine rotational frequencies respectively representing substantially constant machine "rotational speeds."

In some embodiments it may be useful to verify that operating conditions remain substantially constant prior to using the signals. As stated above, gear or bearing related problems result in a change in the torsional vibration characteristic of a drive train. As a consequence of the periodicity of the rotating machine, the components of the torque which is due to the degradation of the gear and bearing performance are periodic. For gears, the cycle length of a "gear wear signal" is determined by the rotational speed of the machine and the number of teeth on the gears.

The machine condition indicative signals can either be directly observed as components of the rotational frequency or torque of the machine, or by using an accelerometer located, for example, on the gearcase, which captures the vibration of the machine. For these signals, the degradation of gears or bearings can be observed in the respective associated characteristic frequencies (which correspond to the cycle-lengths of the associated periodic part of the wear signal) and in the corresponding higher order harmonics. In one embodiment, the machine rotational speed is used to determine the frequency ranges where changes caused by gear and bearing problems can be expected.

Alternatively or additionally, machine condition indicative signals can be derived from the current and/or voltage of the machine. For these signals, degradation of gears or bearings can be observed (due to signal modulations by the inverter) from frequencies which are sidebands of the fundamental and harmonics.

The rotational speed, load, and direction parameters can be captured by or calculated from signals generated by appropriate sensors 31. For example, rotational speed can be estimated from the spectrum of the recorded signal, and further evaluation can make use of this estimate instead of using measured information. The load torque of the machine may be calculated from the voltages and currents but also contains torque pulsation due to the gears as well as the load.

Once the signals indicative of machine conditions are obtained and recorded, the signals are transformed into a frequency spectrum either by using a classical Fourier transform such as a Discrete Fourier Transform or Fast Fourier Transform, for example. A Fourier transform typically decomposes a signal into sinusoid components such that each component corresponds to an integer number of cycles inside the considered time interval. This constraint is by no means necessary to the present invention, and a decomposition of a signal into different frequency components may be carried out in a more general framework. As used herein, "Frequency spectrum" is intended to encompass all such frameworks.

The approach for obtaining and transforming the machine condition indicative signals is selected to provide the necessary resolution in frequency such that it is possible to separate components of the signal which are related to the gear meshing or bearing wear from other periodic components of the signal, such as, for example, engine ripple, slot pass frequency, torque pulsations, inverter fundamental, and respective higher harmonics or track irregularities. In an alternative embodiment, analog technology is used to extract spectral information in certain given frequency bands (as a function of rotational speed) by use of commonly available digitally controlled filters.

Once the frequency spectrum is obtained, low level features of the frequency spectrum can be identified. In one embodiment, the low level features include overall energy of the frequency spectrum, relative energy of relevant frequency bands within the frequency spectrum (bands around the characteristic gear meshing and bearing frequencies and/or harmonics, for example), and peak sharpness'within the relevant bands of the frequency spectrum. The low level features may include other features which characterize the local shapes of the spectrum in the relevant frequency bands. Preferably, the low level features are selected to occur at frequencies sufficiently remote from other periodic component frequencies such that disturbance from the other periodic components is negligible.

In one embodiment, the relevant frequency bands are scaled according to the machine rotational speed. For instance, if feature $x_i$ at a given machine rotational speed corresponds to the relative energy of the signal inside the frequency interval $[f_0, f_1]$, then $x_i$ at twice the machine rotational speed is given by the relative energy of the corresponding signal inside the frequency interval $[2f_0, 2f_1]$. All other features, such as the energy in other relevant frequency bands, or the sharpness of the peak of the spectrum in the relevant frequency bands, can also accordingly be scaled in frequency.

Figure 4:
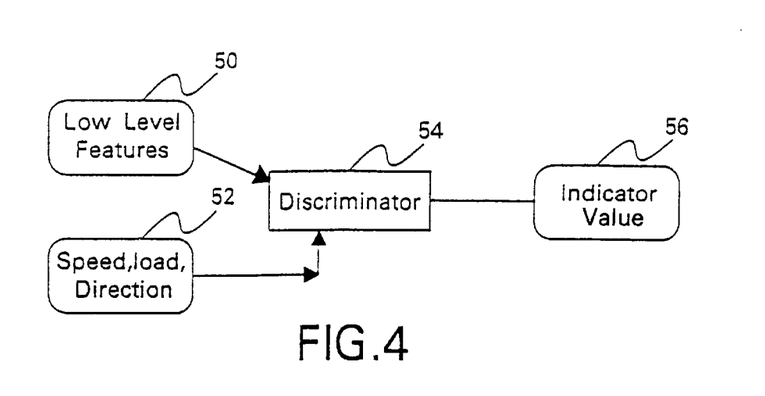
FIGS. 4–6 are flow diagrams representing example indicator value determination embodiments for use in the embodiment of FIG. 3.

As shown in the embodiment of FIG. 4, the low level features 50 can be processed by a discriminator 54 (typically included within processor 34 of FIG. 3) to obtain (at 56) an indicator value representative of the machine conditions. In one embodiment, the indicator value is obtained from the low level features by using discriminator functions previously obtained by training for corresponding low level features extracted from signals measured for a similar machine. These discriminator functions form a set of discriminator functions. In operation, the discriminator function which is chosen from the set for processing the low level features is determined by the speed, load, and direction information.

In a more specific embodiment, the training is provided by (i) for each of at least two known machine conditions (such as, for example, gear and bearing wear), for each of a number of rotational speed, direction and load combinations, obtaining a signal (meaning herein and hereinafter at least one signal) indicative of machine conditions over a segment of time, transforming the obtained signal indicative of machine conditions into a frequency spectrum, and identifying low level features of the frequency spectrum, and (ii) for each combination 52 of rotational speed, direction, and load, determining a low level discriminator function for at least a number of the low level features. In operation, the low level discriminator function obtained via the training that corresponds to the particular rotational speed, direction, and load can then be used to obtain the indicator value for the corresponding low level features. Further, data acquired during normal operation can be used to continuously update the discriminator functions by repeating or updating the training process.

Figure 5:
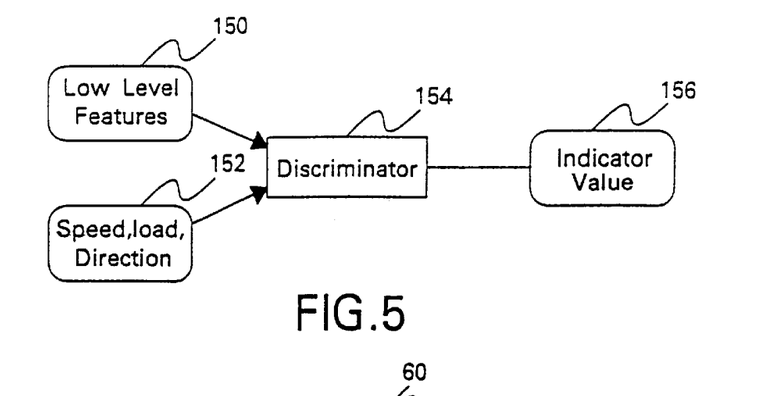

As shown in the alternative embodiment of FIG. 5, the rotational speed, load and direction parameters 152 can be included as additional low level features in addition to the frequency spectrum low level features 150. For obtaining an indicator value 156, this embodiment may use multiple discriminators in a manner similar to that described above or a single low level discriminator 154 that is independent of the operating conditions. In this embodiment, training is provided by identifying low level features of the frequency spectrum and low level features comprising the rotational speeds, directions, and loads and determining a low level discriminator function for at least a number of the low level features.

Figure 6:
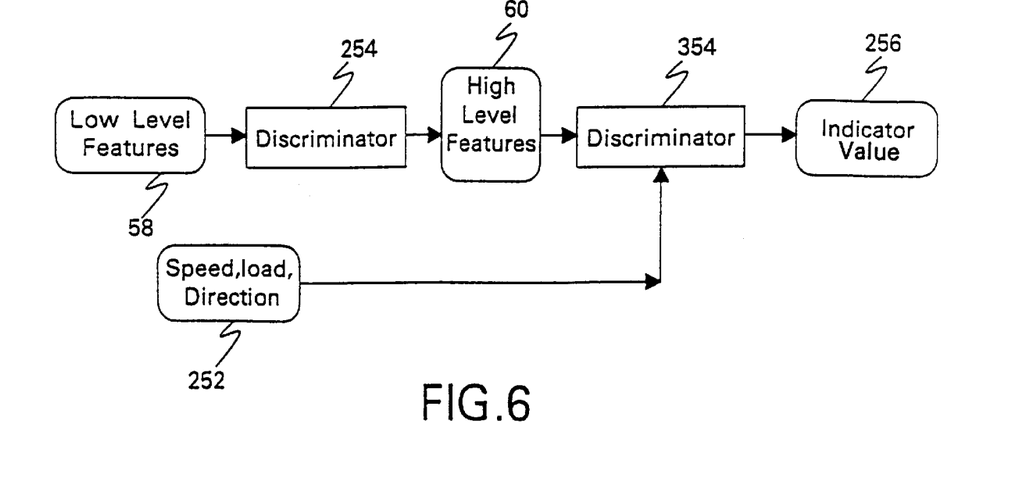

In any of the embodiments of FIGS. 4–6, optional interpolation of predetermined (that is, previously determined through the learning/training process) discriminator functions can be used to identify an appropriate discriminator function in the event that a machine is operating under operating conditions that are not part of a previous training set. For linear embodiments, weighting factors for such other operating conditions can be obtained by using a bilinear interpolation, for example. Interpolation can optionally be adjusted from a bilinear to a higher degree interpolation. This is particularly useful if the current estimated level of wear is not consistent (within some statistical variation) with the previously estimated values, provided that the previous estimates of the level of wear were using these interpolated coefficients and the machine is in one of a group of prespecified rotational speed/load/direction states which allow for a reliable estimation of the level of wear. Under these conditions the interpolation can be adjusted to yield consistent estimates for the level of wear.

EXAMPLE 1

In Example 1, two sets of signals correspond to two different levels of wear, and a linear combination of low-level features which is an optimal discriminator between the two sets is determined by using a Fisher linear discriminant method such as described in R. O. Duda & P. E. Hart, Pattern Classification and Scene Analysis, Wiley, 1973, for example.

In particular, $\vec{y}_j = (Y_{j1}, \ldots, Y_{jM})^T$ represent the low level feature vectors of the data sets in the low wear level set, and $\vec{z}_j = (z_{j1}, \ldots, z_{jM})^T$ represent the corresponding feature vectors of the high wear level set. Then the linear function $$\vec{a}^T \vec{x} = \sum_i a_i x_i$$

for which $$\frac{(\vec{a}^T \vec{m}_y - \vec{a}^T \vec{m}_z)^2}{s_y^2 + s_z^2}$$

is maximum is the Fisher linear discriminant. In this example, $\vec{a} = (a_1, \ldots, a_M)^T$ is a parameter vector which represents the weights in the optimal linear combination of low-level features, $$\vec{m}_y = \frac{1}{N_y} \sum_j \vec{y}_j$$

is the sample mean of the feature vectors in the first set with $N_y$ being the number of low wear level data sets, $$\vec{m}_z = \frac{1}{N_z} \sum_j \vec{z}_j$$

is the sample mean of the feature vectors in the second set with $N_z$ being the number of high wear level data sets, and $s_y^2$ and $s_z^2$ represent the sample scatters in direction $\vec{a}$, that is, $$s_y^2 = \frac{1}{N_y} \sum_j (\vec{a}^T \vec{y}_j - \vec{a}^T \vec{m}_y)^2, \text{ and } s_z^2 = \frac{1}{N_z} \sum_j (\vec{a}^T \vec{z}_j - \vec{a}^T \vec{m}_z)^2.$$

Finding the coefficient vector $\vec{a}$ corresponds to finding a direction such that the sample means $\vec{a}^T \vec{m}_y$ and $\vec{a}^T \vec{m}_z$ in direction $\vec{a}$ are best separated in relation to the sample scatter in that direction. Using $\vec{a}$, which is determined up to a multiplicative factor, now weighting factors $\alpha$ and $\beta$ can be chosen such that $$\alpha \vec{a}^T \vec{x} + \beta = w,$$

yields a good indicator w (a weighted sum) for the level of wear measured. Determining $\alpha$ and $\beta$ is done by solving the system of linear equations given by $$\alpha \cdot \vec{a}^T \vec{m}_y + \beta = w_y$$

$$\alpha \cdot \vec{a}^T \vec{m}_z + \beta = w_z$$

where $w_Y$ and $w_Z$ are given by the average level of wear for $\vec{y}_j$ and $\vec{z}_j$, respectively. With this approach a feature vector $\vec{x}$ which corresponds to a new measurement can be mapped to the associated estimated level of wear w via the equation $w = \alpha \cdot \vec{a}^T \vec{x} + \beta$.

Figure 7:
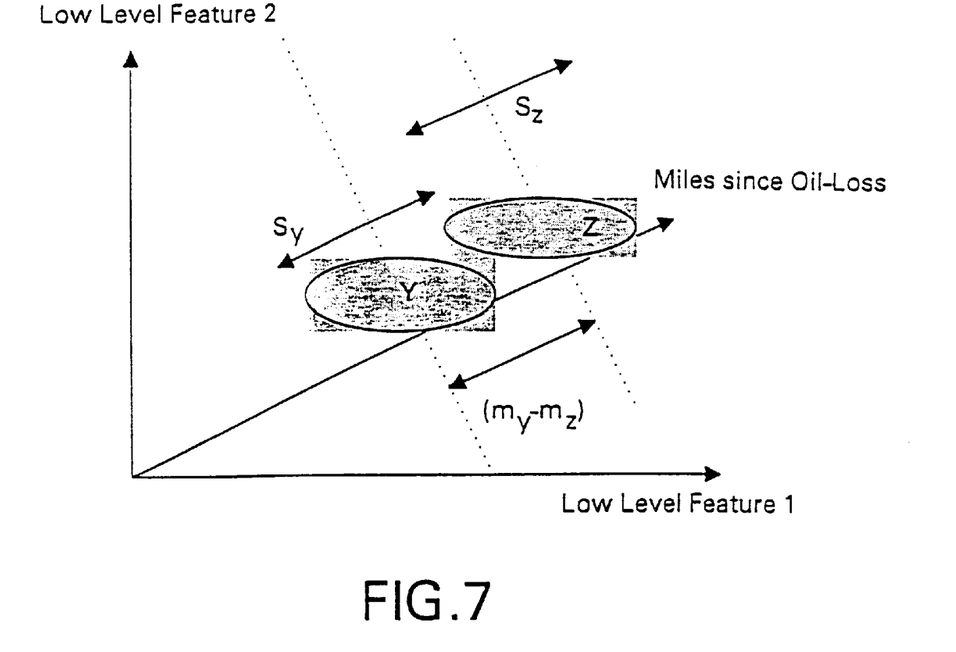
FIG. 7 is a graph illustrating underlying principles of applying a Fisher Linear Discriminant in accordance with one embodiment of the present invention.

FIG. 7 is a graph illustrating underlying principles of applying a Fisher Linear Discriminant. The optimal direction in feature space is determined such that the sample means are best separated (in that direction) relative to the sample scatters (in that direction). Thus, in the embodiment of Example 1, the low level features from a data set for the given load, direction, and rotational speed can be converted directly into an indicator of wear without forming high level features.

FIG. 6 is a flow diagram representing another example indicator value determination embodiment. In the embodiment of FIG. 6, the low level features 58 are combined into a set (typically, but not necessarily, a smaller set) of high level features 60 by discriminator 254. The high level features are then applied to a discriminator 354 in conjunction with speed, load, and direction information to arrive at an indicator value 256.

In the embodiment of FIG. 6, discriminator 254 can take one of several different forms. In one example, discriminator 254 includes a discriminator function set that is arranged such that each rotational speed, direction, and load combination has one corresponding discriminator function. The low level features are then fed into discriminator 254 and applied to each discriminator function regardless of the operating condition set under which the machine condition indicative signal was obtained. The resulting high level features are used in conjunction with the speed, direction, and load information by function 354 to obtain the indicator value.

In a more specific embodiment, the set of discriminator functions included in discriminator 254 is obtained by using the above-described training approach for determining the weights of the low level features of discriminator 54 (FIG. 4) for each rotational speed, direction, and load combination.

In another embodiment, rather than having a one-to-one correspondence between speed/load/direction related discriminator functions, a plurality of discriminator functions can correspond to a single speed/load/direction combination in discriminator 254. In this embodiment, a greater number of discriminator functions (and corresponding high level features) exist than speed/load/direction combinations. Again, resulting high level features 60 are used by discriminator 354 in conjunction with the speed/load/direction information and training of the nature discussed above with respect to FIG. 4 to calculate the indicator value at 256.

In a more specific embodiment, additional sets of weights to obtain the high level features 60 through discriminator 254 from low level features can be obtained by repeating the above-described approach for weights of low level features of discriminator 54 (FIG. 4) with the additional constraint that the new parameter vector $\vec{a}'$ be orthogonal to the previously determined parameter vectors $\vec{a}$. In practice this can be achieved by projecting all feature vectors $Y_j$ and $z_j$ onto the hyperplane $\vec{a}^T\vec{x}=0$, and then using the same approach as described above.

In another embodiment, which can be used either with the one-to-one or one-to-plurality of discriminator functions embodiments, discriminator 254 can be modified in a training and/or an operating environment by clustering of discriminator 254 functions. In this embodiment, at least one good discriminator function must remain for each speed/load/direction combination (although it is possible that two or more speed/load/direction combinations can share a single discriminator function).

In a more specific embodiment using principal components, weight vectors are used to determine respective discriminator functions for respective ones of the plurality of rotational speed/load/direction combinations. In this embodiment the weight vectors are normalized, that is, multiplied by an appropriate factor such that they are of length one. The weight vectors are optimally used with their original orientation as well as with reversed orientation (change of sign). A principal components analysis of this set of points can be used to determine the directions in which the most variation of these weight vectors (and the corresponding "negatives") occurs. Principal components analysis is described herein for purposes of example. If desired, other clustering algorithm techniques can be used instead of principal components analysis.

Regardless of the manner of obtaining the high level features, once obtained, the high level features can be used by discriminator 354 to obtain an indicator value 256. Discriminator function(s) for discriminator 354 can be obtained through the same type of training discussed above with respect to the embodiment of FIG. 4 so that, for example, for each rotational speed/load/direction combination a single discriminator function for the level of wear can be determined. A reliable discriminator function is thus obtained for the level of wear for each of the predefined rotational speed/load/direction combinations used for training.

Although the above discussion has primarily referred to linear functions and weighting factors for purposes of illustration, the present invention is not limited to linear functions and weighting factors. In other embodiments, the low level discriminator function (and/or, if applicable, the high level discriminator function) comprises a non-linear function. Non-linear functions are expected to both increase the estimation accuracy and increase computational complexity. The combining of the low level features into a set of high level features, determining respective high level discriminator functions for the high level features, and using the high level discriminator functions to determine an indicator value representative of machine conditions (such as an estimate of level of gear or bearing wear, for example) are equally applicable for non-linear function embodiments. In addition, appropriate interpolation techniques can be used also for non-linear function embodiments in order to identify an appropriate discriminator function in the event that the machine is operating under operating conditions that are not part of a previous training set.

EXAMPLE 2

In Example 2, determining the low level discriminator functions comprises using multiple regression of at least three sets of features indicative of at least three different machine conditions (at substantially constant rotational speed, load, and direction) to determine a combination of the low level features of the at least three sets of features which is an optimal discriminator. In one example of this embodiment, the training data corresponds to three or more levels of wear. In particular, it is assumed that feature vector $\vec{y}_j$ corresponds to the level of wear $w_j$, and a coefficient vector $\vec{a}$ and a constant $\beta$ are determined such that $$\vec{a}^T\vec{y}_j + \beta = W_j \text{ for all } j,$$

in the least squares sense. This corresponds to choosing a direction $\vec{a}$ and providing the axis in direction $\vec{a}$ with its own scale and origin such that the projection of a feature vector $\vec{x}$ onto that axis is a good estimate, in the least squares sense, of the associated level of wear w.

Figure 8:
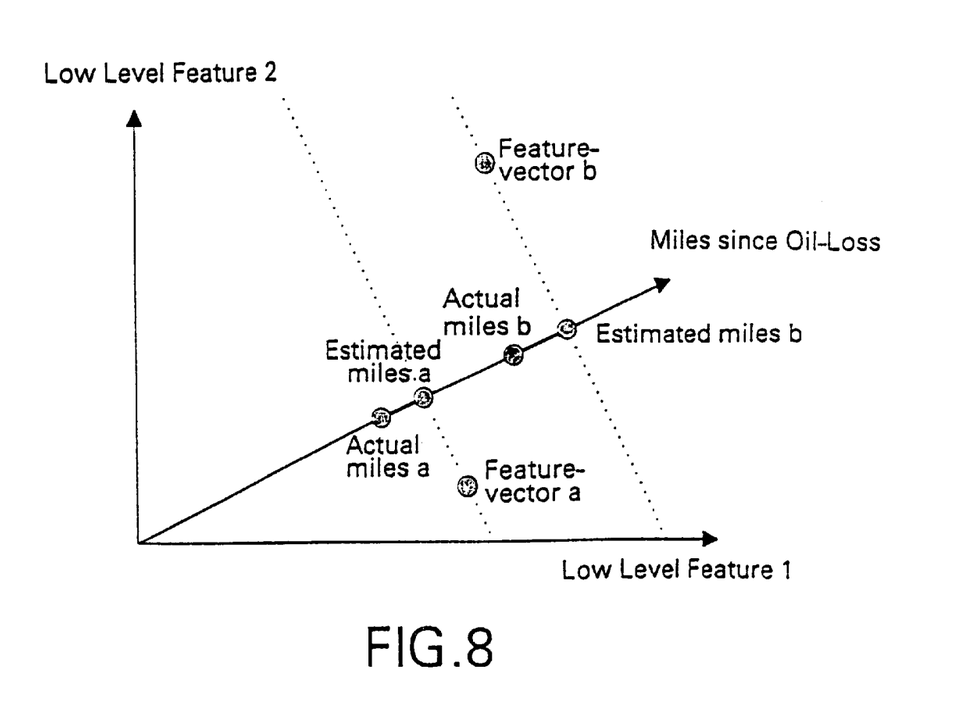
FIG. 8 is a graph illustrating underlying principles of applying a Multiple Linear Regression in accordance with one embodiment of the present invention.

FIG. 8 is a graph illustrating underlying principles of applying a Multiple Linear Regression. An optimal direction in feature space together with a scale and an origin is determined such that the projection of a feature vector onto the resulting axis is an optimal estimate, in the least squares sense, of the associated level of wear or equivalent miles since oil loss (ewm—the miles traveled under oil loss conditions that are representative of the level of wear). A second, third, etc. component of a high level feature vector can be determined by considering the projection of the feature vectors on the orthogonal complement of the space spanned by the previously determined weight vectors $\vec{a}$.

Due to unknown factors which may cause transients and outliers in the data which do not correspond to normal operating conditions, it is generally advisable to make use of some form of robust statistics when determining the discriminator functions. For example, one may want to use a least median of squares approach such as described in P. J. Rousseeuw, Robust Estimation and Identifying Outliers, in Wadsworth Jr, H. M. (Ed.), Handbook of Statistical Methods for Engineers and Scientists, McGraw-Hill, 1998, instead of the standard least squares, which is in fact a least sum of squares, when using the multiple linear regression formulation.

As discussed above with respect to Example 1, although a linear version of Example 2 is presented for purposes of illustration herein, the combination may comprise a linear combination or a non-linear combination.

Examples 1 and 2 are described for purposes of example only. Other appropriate learning or training techniques may be used for constructing a mapping from the low-level feature space to the indicator value or to the low dimensional high level feature space, and also from the high level feature space to the indicator value. Several examples are neural networks, nearest neighbor classification, fuzzy inference system, principal component analysis, and Bayesian based approaches and other parametric methods.

In one embodiment, the steps of obtaining signals, identifying low level features, and obtaining indicator values (whether directly from low level features or from high level features derived from low level features) are repeated, and a representation (such as a curve, for example) of machine condition degradation as a function of time is formed. The representation can be used to monitor the rate of change of degradation and/or to estimate time remaining prior to reaching a critical threshold.

Thus, when used on a locomotive, the number of road failures can be reduced. For example, if the indicator value or the rate of degradation indicates that a potentially serious problem is likely to occur, the operator can be notified. Similarly, if the estimated time remaining prior to reaching a critical threshold means that the locomotive might not reach the intended destination, the operator can be notified.

Figure 9:
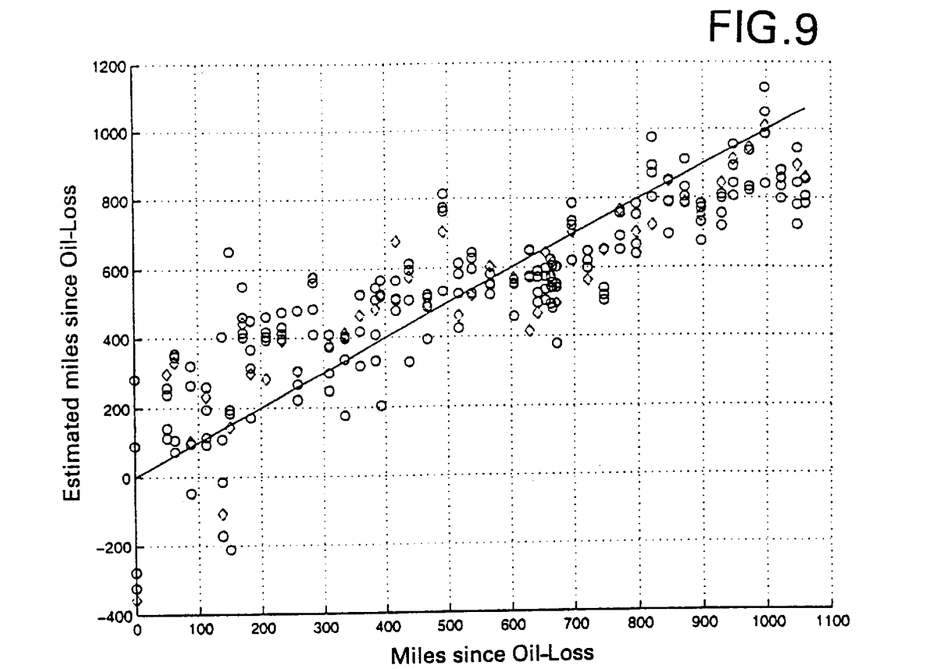
FIGS. 9 and 10 are graphs illustrating experimental test results.
Figure 10:
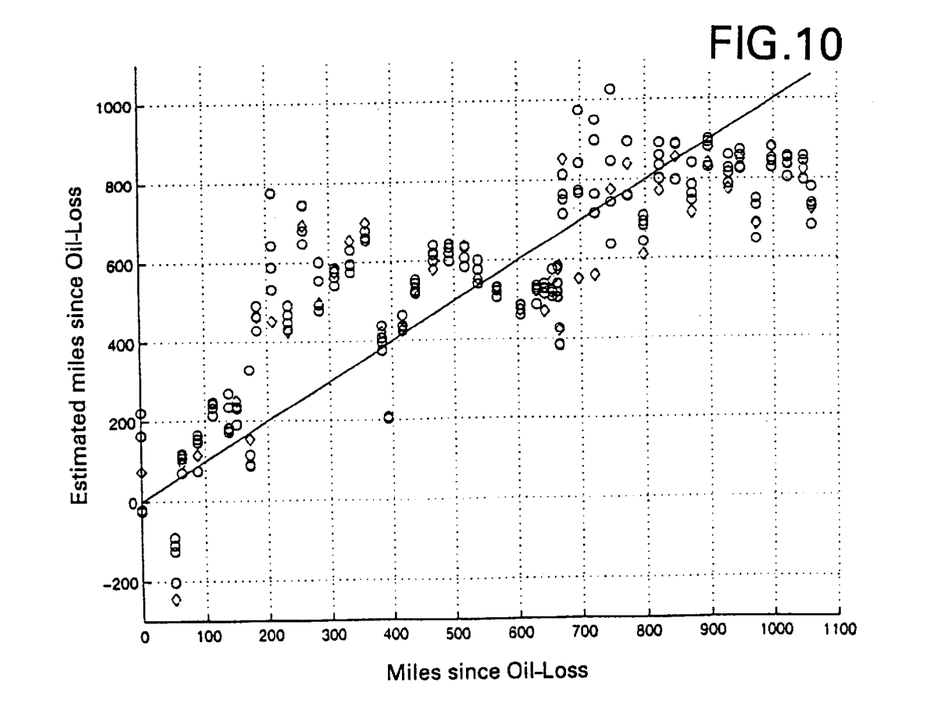

FIGS. 9 and 10 are graphs illustrating experimental test results. Several embodiments of the present invention were applied to data sets which were acquired on a locomotive motor and drive test stand where the machine was running at a constant 50 mph and with full load for the equivalent of 1000 miles after complete oil loss from the gear case. The evaluated data included machine currents (FIG. 9) and accelerometer data (FIG. 10). Using multiple linear regression, good indicators for the level of wear were obtained.

FIG. 9 is a graph illustrating estimated miles since oil-loss as compared with actual miles since oil-loss using multiple linear regression analysis of machine current test data as described in Example 2. The low level features used in the embodiment of FIG. 9 were: Energy in four frequency bands around gear meshing frequency and harmonics +/−alternator fundamental frequency. The indicator value (obtained from a weighted sum of the low level features) was a good estimator for the level of gear wear.

FIG. 10 is a graph illustrating estimated miles since oil-loss as compared with actual miles since oil-loss using multiple linear regression analysis of accelerometer (vibration) data as described in Example 2. The low level features were selected to be: Energy in four frequency bands around gear meshing frequency and harmonics and overall energy of the signal. Again, an obtained weighted sum of low level features was a good estimator for the level of gear wear.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A machine monitoring method comprising:
   (a) obtaining signals indicative of machine conditions, machine rotational speed, direction, and load conditions over a segment of time under substantially constant operating conditions;
   (b) transforming the obtained signal indicative of machine conditions into a frequency spectrum;
   (c) identifying low level features of the frequency spectrum; and
   (d) using the signals indicative of machine rotational speed, direction, and load conditions and processing the low level features to obtain an indicator value representative of the machine conditions.

2. The method of claim 1 further comprising
   (e) repeating (a) through (d) and constructing a representation of machine condition degradation as a function of time.

3. The method of claim 2 further including using the representation to monitor the rate of change of degradation.

4. The method of claim 2 further including using the representation to estimate time remaining prior to reaching a critical threshold.

5. The method of claim 1 wherein the low level features include overall energy of the frequency spectrum, relative energy of relevant frequency bands within the frequency spectrum, and frequency spectrum peak shape-characterizing features within the relevant frequency bands.

6. The method of claim 5 wherein (c) includes scaling the relevant frequency bands according to the machine rotational speed.

7. The method of claim 1 further including,
   prior to (a), learning for use in (d) by
   (i) for each of at least two known machine conditions, for each of a number of rotational speed, direction and load combinations, obtaining a signal indicative of machine conditions over a segment of time, transforming the obtained signal indicative of machine conditions into a frequency spectrum, and identifying low level features of the frequency spectrum,
   (ii) for each combination of rotational speed, direction and load, determining a low level discriminator function for at least a number of the low level features,
   wherein (d) includes using the low level discriminator function to obtain the indicator value.

8. The method of claim 7 wherein, in the event that the signals indicative of rotational speed, direction, and load conditions do not match a respective one of the number of rotational speed, direction, and load combinations, (d) further includes interpolating predetermined low level discriminator functions to identify an appropriate discriminator function.

9. The method of claim 1 further including,
   prior to (a), learning for use in (d) by
   (i) for each of at least two known machine conditions, for each of a number of rotational speed, direction and load combinations, obtaining signals indicative of machine conditions, rotational speed, direction, and load conditions over a segment of time, transforming the obtained signal indicative of machine conditions into a frequency spectrum, and identifying low level features of the frequency spectrum and low level features comprising the rotational speeds, directions, and loads, and
   (ii) determining a low level discriminator function for at least a number of the low level features, wherein (d) includes using the low level discriminator function to obtain the indicator value.

10. The method of claim 7 wherein the low level discriminator function comprises a non-linear function.

11. The method of claim 7 wherein the low level discriminator function comprises a linear function including at least one low level weighting factor.

12. The method of claim 11 wherein, for each combination of rotational speed, direction and load, determining the low level weighting factors comprises using two sets of signals indicative of two different machine conditions to determine a linear combination of the low level features of the two sets of signals which is an optimal discriminator between the two sets.

13. The method of claim 11 wherein determining the low level discriminator functions comprises using at least three sets of features indicative of at least three different machine conditions to determine a combination of the low level features of the at least three sets of features which is an optimal discriminator.

14. The method of claim 9 wherein the combination is a linear combination or a non-linear combination.

15. The method of claim 1 wherein processing the low level features to obtain an indicator value comprises using a first set of discriminator functions to combine the low level features into a set of high level features, and then using the high level features, the signals indicative of rotational speed, direction, and load conditions, and a second set of discriminator functions to obtain the indicator value.

16. The method of claim 15 wherein each discriminator function of the first set of discriminator functions corresponds to a respective rotational speed, direction, and load condition.

17. The method of claim 15 wherein multiple discriminator functions of the first set of discriminator functions correspond to a respective rotational speed, direction, and load condition.

18. The method of claim 15 wherein the first set of discriminator functions and the second set of discriminator functions comprise sets of linear or non-linear discriminator functions.

19. The method of claim 15 further including modifying the first set of discriminator functions by clustering the discriminator functions of the first set of discriminator functions into a smaller first set of discriminator functions with at least one good discriminator function remaining for each respective rotational speed, direction, and load condition.

20. The method of claim 15, further including, in the event that the signals indicative of rotational speed, direction, and load conditions do not match rotational speed, direction, and load conditions of a predetermined discriminator function, interpolating predetermined discriminator functions to identify an appropriate discriminator function.

21. A machine monitoring method comprising:
    (a) obtaining signals indicative of machine conditions, machine rotational speed, direction, and load conditions over a segment of time under substantially constant operating conditions;
    (b) transforming the obtained signal indicative of machine conditions into a frequency spectrum;
    (c) identifying low level features of the frequency spectrum, the low level features including frequency spectrum peak shape-characterizing features within relevant frequency bands of the frequency spectrum; and
    (d) using the signals indicative of machine rotational speed, direction, and load conditions and processing the low level features to obtain an indicator value representative of the machine bearing wear and gear wear conditions.

22. The method of claim 21 wherein (d) includes using the signals indicative of machine rotational speed, direction, and load conditions to select a discriminator function, and applying the low level features to the selected discriminator function to obtain the indicator value.

23. The method of claim 21 wherein (d) includes using applying the low level features and the signals indicative of machine rotational speed, direction, and load conditions to a discriminator function to obtain the indicator value.

24. The method of claim 21 wherein (d) comprises using a first set of discriminator functions to combine the low level features into a set of high level features, and then using the high level features, the signals indicative of rotational speed, direction, and load conditions, and a second set of discriminator functions to obtain the indicator value.

25. A machine monitoring system comprising:
    (a) sensors for obtaining signals indicative of machine conditions, machine rotational speed, direction, and load conditions over a segment of time under substantially constant operating conditions; and
    (b) a computer for, transforming the obtained signal indicative of machine conditions into a frequency spectrum, identifying low level features of the frequency spectrum, using the signals indicative of machine rotational speed, direction, and load conditions and processing the low level features to obtain an indicator value representative of the machine conditions.

26. The system of claim 25 wherein the low level features include overall energy of the frequency spectrum, relative energy of relevant frequency bands within the frequency spectrum, and frequency spectrum peak shape-characterizing features within the relevant frequency bands.

27. The system of claim 25 wherein the computer is adapted to process the low level features by applying the signals indicative of machine rotational speed, direction, and load conditions, and the low level features to a discriminator function to obtain the indicator value.

28. The system of claim 25 wherein the computer is adapted to process the low level features by using the signals indicative of machine rotational speed, direction, and load conditions to select a discriminator function, and applying the low level features to the selected discriminator function to obtain the indicator value.

29. The system of claim 28 wherein the discriminator function comprises a non-linear function.

30. The system of claim 28 wherein the low level discriminator function comprises a linear function including at least one low level weighting factor.

31. The system of claim 25 wherein the computer is adapted to process the low level features by using a first set of discriminator functions to combine the low level features into a set of high level features, and then using the high level features, the signals indicative of rotational speed, direction, and load conditions, and a second set of discriminator functions to obtain the indicator value.

32. The system of claim 31 wherein each discriminator function of the first set of discriminator functions corresponds to a respective rotational speed, direction, and load condition.

33. The system of claim 31 wherein multiple discriminator functions of the first set of discriminator functions correspond to a respective rotational speed, direction, and load condition.

34. The system of claim 31 wherein the computer is further adapted to modify the first set of discriminator functions by clustering the discriminator functions of the first set of discriminator functions into a smaller first set of discriminator functions.

35. A machine monitoring system comprising:
   (a) means for obtaining signals indicative of machine conditions, machine rotational speed, direction, and load conditions over a segment of time under substantially constant operating conditions;
   (b) means for transforming the obtained signal indicative of machine conditions into a frequency spectrum;
   (c) means for identifying low level features of the frequency spectrum; and
   (d) means for using the signals indicative of machine rotational speed, direction, and load conditions and means for processing the low level features to obtain an indicator value representative of the machine conditions.

36. The system of claim 35 further including,
   means for learning for use in (d) by
      (i) for each of at least two known machine conditions, for each of a number of rotational speed, direction and load combinations, obtaining at a signal indicative of machine conditions over a segment of time, transforming the obtained signal indicative of machine conditions into a frequency spectrum, and identifying low level features of the frequency spectrum
      (ii) for each combination of rotational speed, direction and load, determining a low level discriminator function for at least a number of the low level features,
   wherein (d) includes means for using the low level discriminator function to obtain the indicator value.

37. The system of claim 35 further including,
   means for learning for use in (d) by
      (i) for each of at least two known machine conditions, for each of a number of rotational speed, direction and load combinations, obtaining signals indicative of machine conditions, rotational speed, direction, and load conditions over a segment of time, transforming the obtained signal indicative of machine conditions into a frequency spectrum, and identifying low level features of the frequency spectrum and low level features comprising the rotational speeds, directions, and loads, and
      (ii) determining a low level discriminator function for at least a number of the low level features,
   wherein (d) includes means for using the low level discriminator function to obtain the indicator value.

38. The system of claim 35 wherein (d) includes means for using a first set of discriminator functions to combine the low level features into a set of high level features, and then using the high level features, the signals indicative of rotational speed, direction, and load conditions, and a second set of discriminator functions to obtain the indicator value.

* * * * *